(12) United States Patent  (10) Patent No.: US 7,907,846 B2
Quast  (45) Date of Patent: Mar. 15, 2011

(54) ELECTROOPTICAL COUPLING DEVICE

(75) Inventor: Erhard Quast, Friesenhagen (DE)

(73) Assignee: Norgren GmbH, Fellbach (DE)

( * ) Notice: Subject to any disclaimer, the term of this patent is extended or adjusted under 35 U.S.C. 154(b) by 700 days.

(21) Appl. No.: 11/918,202

(22) PCT Filed: Apr. 11, 2006

(86) PCT No.: PCT/DE2006/000648
§ 371 (c)(1),
(2), (4) Date: Oct. 11, 2007

(87) PCT Pub. No.: WO2006/108403
PCT Pub. Date: Oct. 19, 2006

(65) Prior Publication Data
US 2009/0226180 A1  Sep. 10, 2009

(30) Foreign Application Priority Data

Apr. 11, 2005 (DE) .......................... 10 2005 016 735

(51) Int. Cl.
*H04B 10/00* (2006.01)
(52) U.S. Cl. ........................................ 398/139; 398/138
(58) Field of Classification Search .................. 398/135, 398/138, 139, 141, 151, 171, 153, 165, 128, 398/130
See application file for complete search history.

(56) References Cited

U.S. PATENT DOCUMENTS

| | | | |
|---|---|---|---|
| 4,928,319 A * | 5/1990 | Pitt et al. ...................... | 398/171 |
| 6,492,650 B1 | 12/2002 | Imai et al. | |
| 6,636,782 B2 * | 10/2003 | Morikawa et al. ............ | 700/282 |
| 2004/0057731 A1 | 3/2004 | Ozeki et al. | |
| 2005/0096756 A1 | 5/2005 | Quast et al. | |

FOREIGN PATENT DOCUMENTS

| | | |
|---|---|---|
| DE | 100 36 237 | 2/2001 |
| DE | 103 53 295 | 6/2005 |
| JP | S62-052282 | 3/1987 |
| JP | U-S63-123878 | 5/1988 |
| JP | 2176290 A | 7/1990 |
| JP | 05065967 | 3/1993 |
| JP | 05-180366 | 7/1993 |
| JP | A-AH05-180366 | 7/1993 |
| JP | 06123374 | 5/1994 |
| JP | A-2002-195440 | 7/2002 |
| JP | 2004-112716 | 4/2004 |
| WO | WO-01-31607 A1 | 5/2001 |

OTHER PUBLICATIONS

EP 1 431 588, Jun. 2004, Europe (ISR) (With English Abstract).
EP 1 002 961, May 2000, Europe (ISR) (With English Abstract).
International Search Report.

* cited by examiner

*Primary Examiner* — M. R. Sedighian
(74) *Attorney, Agent, or Firm* — The Ollila Law Group LLC

(57) ABSTRACT

The invention relates to a device for coupling electrical data lines, especially a bus system, to a modular valve station which comprises a plurality of valve modules. The coupling device comprises a coupling module that can be connected to the electrical data lines for converting the electrical signals of the data lines to optical signals, and a transceiver module for data communication with the valve modules which communicates with the electrical coupling module by optical means and can be coupled to the valve module on the input side.

8 Claims, 3 Drawing Sheets

US 7,907,846 B2

ELECTROOPTICAL COUPLING DEVICE

CROSS REFERENCE TO RELATED APPLICATIONS

Applicant claims priority under 35 U.S.C. §119 of German Application No. 10 2005 016 735.7 filed Apr. 11, 2005. Applicant also claims priority under 35 U.S.C. §365 of PCT/DE2006/000648 filed Apr. 11, 2006. The international application under PCT article 21(2) was not Published in English.

The present invention relates to a device for coupling electrical data lines to a modular valve station as defined in the preamble of claim 1.

BACKGROUND OF THE INVENTION

Such a modular valve station, also known as valve island, has been disclosed for example in non-anticipating DE 103 53 295.1. In a modular valve station a plurality of valve blocks are connected one with the other so as to form a structural unit that can be connected to a control line by an electrical main plug (multipole) or a field bus interface, for example. The valve station known from DE 103 53 295.1 comprises valve modules in which data transmission is effected by optoelectronical means. This is an essential advantage, compared with the connection of the valve modules by electrical plug-and-socket connectors which in most of the cases have to meet stringent mechanical tolerances and may easily be damaged, for example by bending of the contacts, or the like. Moreover, such valve stations are very frequently used under critical environmental conditions where electric contacts are undesirable.

Data communication by optoelectronical means between the different valve modules overcomes these disadvantages, avoids mechanical interfaces and, especially, allows very advantageous electrical separation to be realized.

Still, coupling electric data lines, for example to a field bus system, has to be effected, in the case of the valve stations disclosed by DE 103 53 295.1, by plug-and-socket connectors, for example by the before-mentioned electrical main plugs (multipole).

JP 05-180366 A discloses a common control device for actuators that comprises an optical transmitter for converting electrical signals to optical signals. In that case, a transceiver communicates with different valves of a non-modular valve island by optical means via data lines.

Now, it is the object of the present invention to provide a device for coupling electrical data lines to a modular valve station, which does without any electrical plug-and-socket connectors and which can be adapted to the most different electric signal forms.

This object is achieved by a device for coupling electrical data lines to a modular valve station having the features defined in claim 1.

ADVANTAGE OF THE INVENTION

In order to avoid electrical plug interfaces, the coupling device according to the invention for coupling electrical data lines to the valve modules of modular valve stations provides for a coupling module and a transceiver module separate from the coupling module. The coupling module can be connected to the electrical data line and converts the electric signals of the data lines to optical signals. The transceiver module is coupled to the valve module on the input end for data communication with the valve modules by optoelectrical means. This subdivision into a coupling module and a transceiver module allows the most different data lines to be coupled to a modular valve station with valve modules, by adapting the coupling module to the particular characteristics of the electrical data lines and adapting the transceiver module to the data transmission systems of the valve modules. It is especially the device comprising the coupling module and the transceiver module that allows the data supplied by the most diverse kinds of electrical devices, consumers, or the like, to be converted and adapted to the particular kind of data accommodated by a valve island. This allows devices and equipment of any kind to be coupled to, and to communicate with, a valve island, which possibility is not provided in that form by the valve islands known from the prior art.

The measures and features defined in the sub-claims permit advantageous further developments and improvements of the control system described in claim 1.

The data signal may be a parallel electric data signal, for example, by which different loads can be controlled. The signal is converted immediately to a serial optical signal in this case. According to an advantageous embodiment, the signal is a bus signal which initially is converted to a parallel electric signal in the coupling module and is then converted to a serial optical signal. The coupling module thereby can be adapted very advantageously to the most different signal forms.

Preferably, the electrical data lines form a bus system. The coupling module is the last module of a bus node in this case. The bus system especially may be a local bus system.

An especially advantageous embodiment provides that the transceiver module communicates with the valve modules by optoelectronical means, via optoelectronical transceiver means for bidirectional data communication.

The transceiver means are advantageously realized by photodiodes and/or phototransistors.

By sort of subdividing the device into a coupling module and a transceiver module it is additionally possible, in a very advantageous way, to have the bidirectional optical data transmission over longer distances effected by at least one optical waveguide arranged between the output of the coupling module and the input of the transceiver module. Even disadvantageous installation conditions can be accommodated in this way.

Bidirectional optical data transmission is preferably effected by means of nonvisible light, especially light in the infrared wavelength range.

DRAWING

Further advantages and features of the invention will be apparent from the description that follows and from the illustrations of certain embodiments of the invention.

DESCRIPTION OF THE EMBODIMENTS

Figure 1:
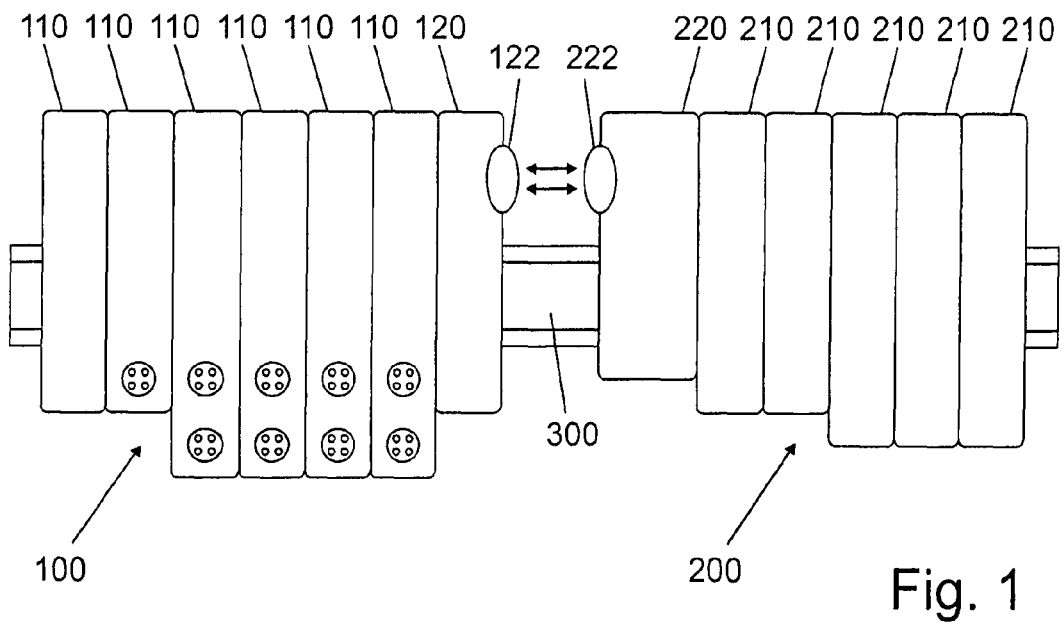
FIG. 1 shows a diagrammatic representation of a coupling device using the invention, for optically coupling a modular valve station to a field bus node.

A modular valve station 200, also known as valve island, comprises a plurality of valve modules 210 attached one to the other. The valve modules 210 in their turn comprise switching means (not shown) for data communication and for driving valves, actors or sensors (not shown). Now, such a valve station 200 is to be connected to a field bus node 100 which in its turn comprises a plurality of I/O modules 110 (input/output modules). The last module in that sequence is a coupling module 120 which converts the electric data of the field bus system to optical data and transmits the latter via an optical transceiver means 122 to an optical transceiver means 222 of a transceiver module 220 which is connected to the input of the first valve module 210 and is connected optoelectronically with the latter for data transmission.

As illustrated in FIG. 1, the valve station 200 may be connected to the field bus node 100 via a busbar 300, for example. The coupling module 120 is adapted to the bus system, for example a local bus, whereas the transceiver module 220 has its optical data transmission response characteristics adapted to the valve modules 210. That sort of two-part system for coupling a field bus node 100 to the valve station 200 not only makes it possible to do without any mechanical plug-and-socket connectors, but also achieves electrical separation of the system. It is thus possible, by the mere exchange of the coupling module 120, to couple different electrical data transmission systems with the valve station 200 very rapidly and with extremely low technical input.

FIG. 1 shows a coupling device in an unfinished assembly condition, where the optical transmission path can be seen more clearly. In the completely assembled condition, the optoelectronical transceiver module 122 of the coupling module 120 is positioned directly opposite the optoelectronical transceiver module 222 of the transceiver module, and the entire arrangement is supported on the busbar 300 which is not visible in the completed state.

Figure 2:
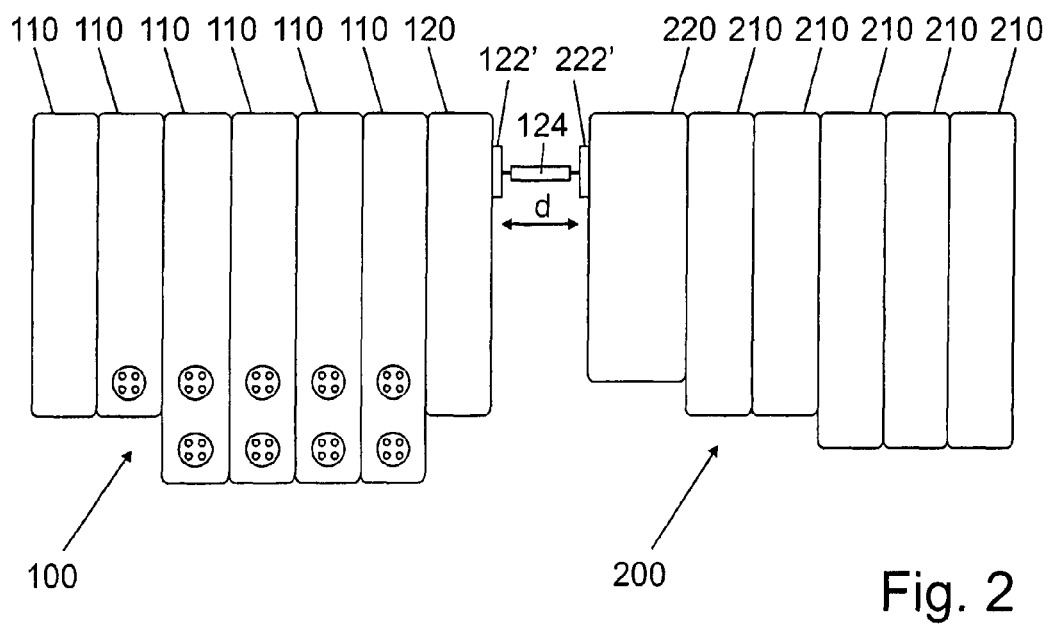
FIG. 2 shows a further embodiment of a coupling device using the invention, for coupling a modular valve station to a field bus node.

In a further embodiment illustrated in FIG. 2, like elements are indicated by the same reference numerals so that reference is made in full to the above explanations as regards the details of such elements.

The embodiment illustrated in FIG. 2 differs from that shown in FIG. 1 in that the coupling module of the first-mentioned embodiment is provided with a decoupling arrangement 122' for an optical waveguide 124 and the transceiver module 220 is likewise provided with an interface for connecting the optical waveguide 124. Data communication is effected in this case bidirectionally by optical means over a distance d, which may be 10 m or more, for example, via the optical waveguide 124. This embodiment provides the advantage that the valve station 200 can be arranged to be absolutely separate from the field bus node also as regards its physical location. This allows data transmission to be realized even under unfavorable space conditions, it being possible in particular to arrange the valve station 200 and the coupling module even at an angle one relative to the other or even in staggered arrangement one relative to the other.

The transceiver module 220 comprises a voltage supply of its own being thus fully decoupled from the electric data line, for example the bus node 100, in terms of voltage supply. It may also be provided to have the voltage supply of the transceiver module 220 realized by the voltage supply of the valve modules 210.

The optoelectronical receiver means and transmitter means can have the most different designs. According to one advantageous embodiment, which can be realized easily and at low cost, the transmitter means are photodiodes and the receiver means are phototransistors. Transmission is then effected especially by light in the non-visible range, with light in the infrared wavelength range being particularly preferred. Data communication between the different valve modules 210 is then effected in a way as described by non-anticipating DE 103 53 295.1, page 7, last paragraph, to page 9, fourth paragraph, which is incorporated herein by reference for disclosure.

Figure 3:
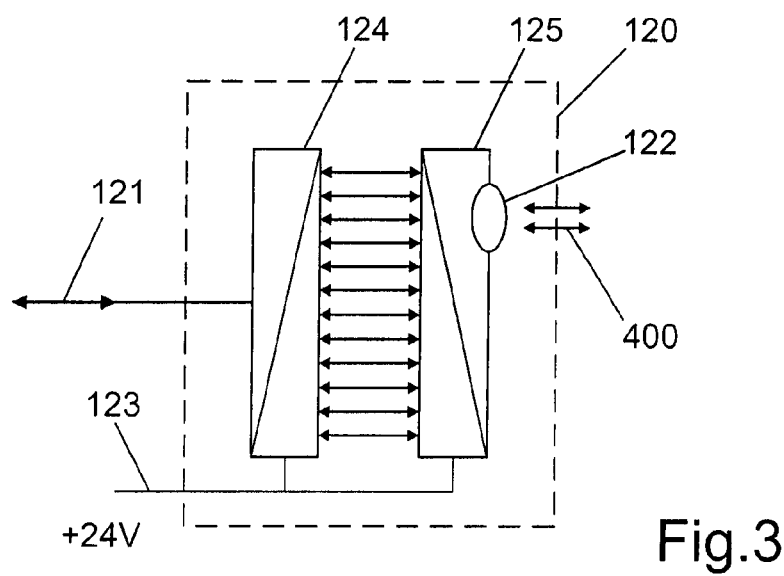
FIG. 3 shows a diagrammatic representation of a block diagram of the coupling module.

A block diagram of a coupling module 120 is shown diagrammatically in FIG. 3. A coupling module 120 comprises on the one hand an input line 121 for the local bus, and on the other hand one or more lines 123 for voltage supply. The coupling module comprises first switching means 124 for conversion of the bus signal to a parallel signal and second switching means 125 for conversion of the parallel signal to a serial signal which is then sent out by the optoelectronical transceiver device 122. The local bus protocol is not needed for such an arrangement.

Figure 4:
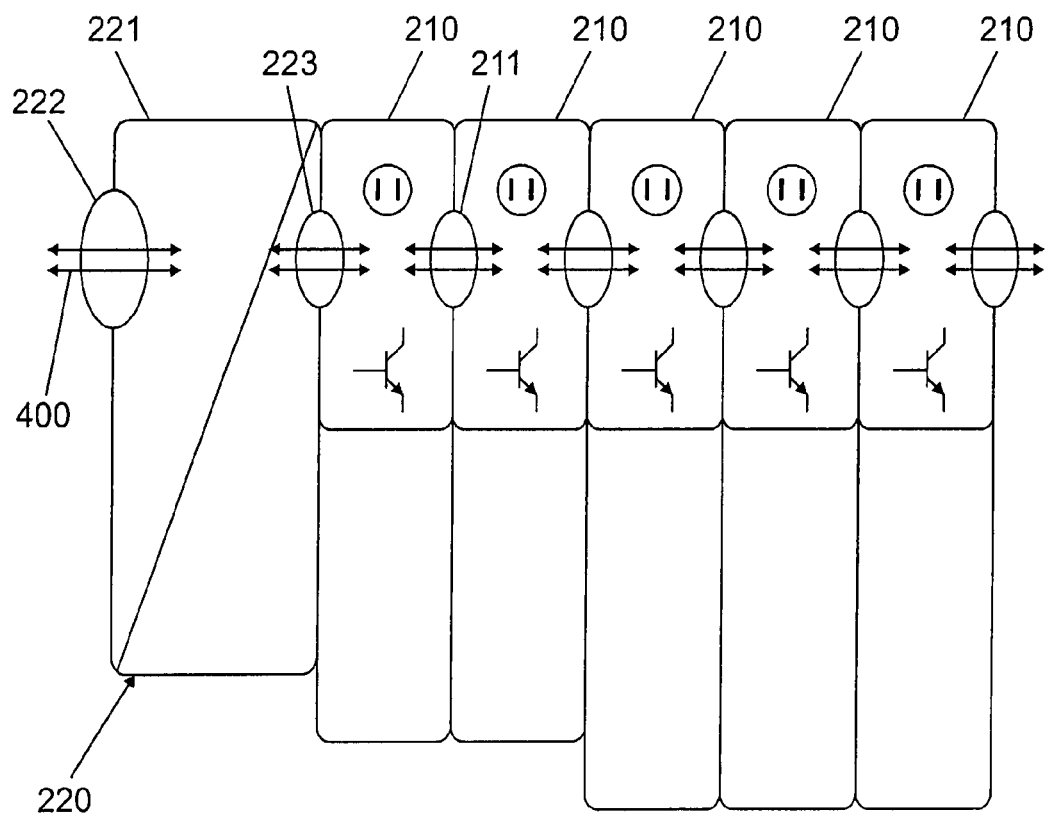
FIG. 4 shows a diagrammatic representation of the block diagram of the transceiver module coupled to the valve module.

A transceiver module 220 illustrated in FIG. 4 comprises a converter 221 for processing the light signal 400 received by the optoelectronical transceiver means 222. The converter 221 converts the signal to a signal compatible with the optoelectronical signal transmission system of the valve unit 210. The converted optical signals are coupled to optoelectronical transceiver means 211 of the valve modules 210 by a further optoelectronical transceiver means 232 which is part of the transceiver module.

Figure 5:
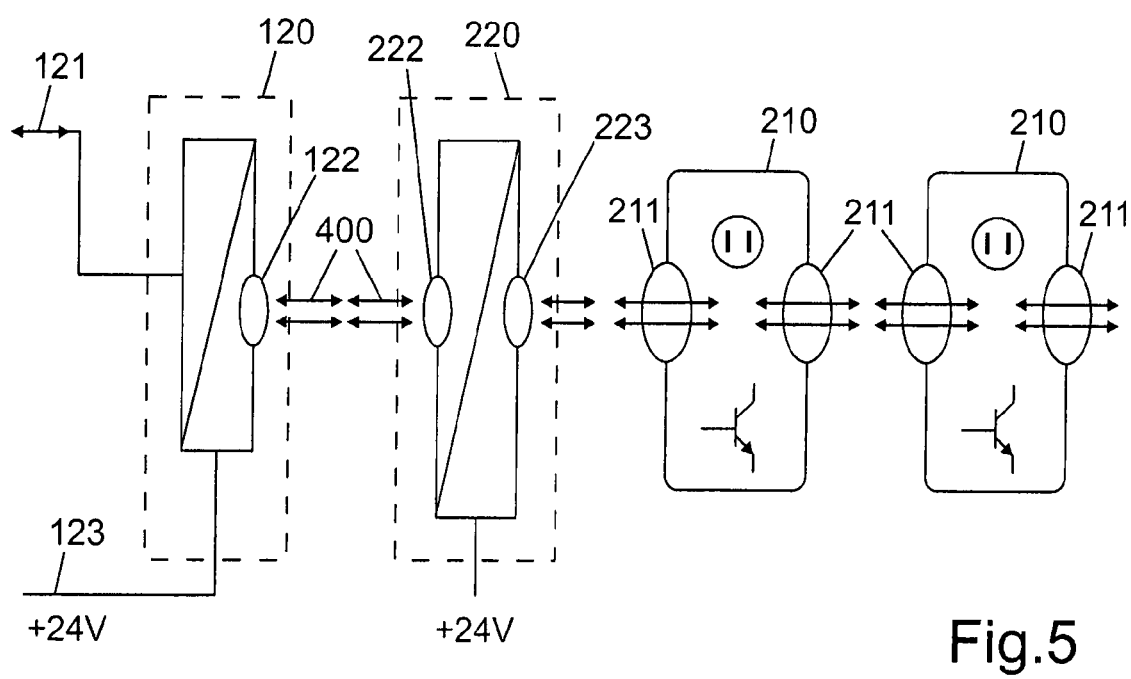
FIG. 5 shows a diagrammatic representation of a further embodiment of a coupling device.

In a further embodiment illustrated in FIG. 5, the local bus protocol in the form of serial electric signals is directly converted to optical signals by the coupling module 120 and is then optically transmitted by the latter to the transceiver module where it is transmitted, likewise serially, to the valve units 210, if necessary after further conversion of the signal form.

The embodiments described above illustrate the very advantageous way of coupling the transceiver module 220 for connection to a valve station 200 the valve modules of which communicate optically one with the other. It is understood that the invention is not limited to that aspect but that, in principle, the transceiver module 220 may also convert the data signals received to electric signals by optical means so that it is possible to use valve stations 200 known as such where data transmission between the valve modules is effected by electrical means.

The invention claimed is:

1. Device for coupling electrical data lines, especially a bus system, to a modular valve station with a plurality of valve modules, comprising:
   a coupling module that can be connected to the electrical data lines for conversion of the electric signals of the data lines to optical signals, wherein the coupling module can be selected according to communication characteristics of the data lines,
   a transceiver module which communicates optically and bidirectionally with the coupling module and which can be coupled to the plurality of valve modules for optoelectronic data communication, and
   at least one optical waveguide arranged between the output of the coupling module and the input of the transceiver module.

2. The device as defined in claim 1, wherein the data signal is a bus signal and that the bus signal is initially converted in the coupling module to a parallel electric signal whereafter the parallel electric signal is converted to a serial optical signal.

3. The device as defined in claim 1, wherein the coupling module is the last module of a bus node, especially of a field bus node.

4. The device as defined in claim 1, wherein data communication of the transceiver module with the valve modules is effected via optoelectronical transceiver means for bidirectional data communication by optoelectronical means.

5. The device as defined in claim 1, wherein optoelectronical data communication is effected by means of photodiodes and/or phototransistors.

6. The device as defined in claim 1, wherein bidirectional optical data transmission is effected via the at least one optical waveguide.

7. The device as defined in claim. 1, wherein bidirectional optical data transmission is effected by non-visible light.

8. The device as defined in claim 7, wherein the wavelength of the non-visible light is within the infrared wavelength range.

* * * * *